F. B. TORREY.
Anti-Friction Roller for Sheaves.

No. 232,423. Patented Sept. 21, 1880.

Witnesses:
R. F. Barnes
Warren Luly

Inventor:
Francis B. Torrey
by Ellis Spear
Attorney

UNITED STATES PATENT OFFICE.

FRANCIS B. TORREY, OF BATH, MAINE.

ANTI-FRICTION ROLLER FOR SHEAVES.

SPECIFICATION forming part of Letters Patent No. 232,423, dated September 21, 1880.

Application filed February 9, 1880.

*To all whom it may concern:*

Be it known that I, FRANCIS B. TORREY, of Bath, in the county of Sagadahoc and State of Maine, have invented a new and useful Improvement in Anti-Friction Rollers for Sheaves; and I do hereby declare that the following is a full, clear, and exact description of the same.

My invention relates to anti-friction bearings, designed more particularly for the sheaves of pulleys.

The invention is an improvement upon that form of anti-friction rollers shown in the patent of Burr, No. 137,415, dated April 1, 1873, in which the rollers are formed with a peripheral groove at the center and are held in place by a notched annular plate.

The object of my invention is to obtain as long a bearing-surface as possible for the cylindrical rollers within the thickness of the sheave.

Figure 1:
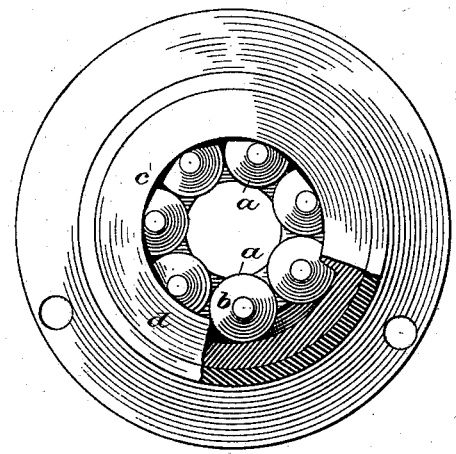
Figure 2:
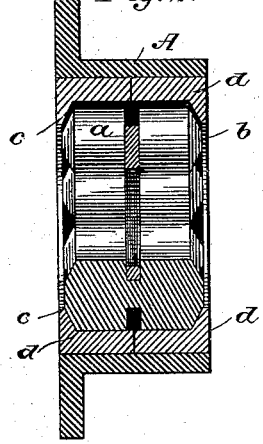
Figure 3:
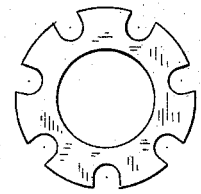

In the accompanying drawings, Figure 1 shows a side elevation, and Fig. 2 a central section of the bushing for an ordinary sheave, provided with my improved anti-friction rollers. Fig. 3 represents the annular holding-ring detached.

As heretofore designed, these anti-friction rollers have been held at proper distances from each other and in proper position in relation to each other by means of the annular disk in the notches of which the necks of the anti-friction rollers were placed; but this ring did not serve the purpose of holding the group of rollers against endwise movement within the bushing, so that it has been necessary to provide flanges on each side to retain the group of rollers within the bushing. As these flanges were necessarily made flush with the surfaces of the sheaves, the anti-friction rollers were diminished in length by twice the thickness of the metal of the retaining-flanges. It is necessary, however, for the best operation of the device, that these anti-friction rollers should be as long as possible within the limits of the sheave and have the greatest amount of bearing-surface on the inner periphery of the bushing. In order to accomplish this I make the rollers *a* conical at the ends, as shown at *b*, and, for the purpose of giving them bearing-surface throughout their entire length, I turn the flanges *c c* with an incline corresponding to the bevel on the ends of the rollers. The inner edge of these flanges may, therefore, be made very thin and the rollers come out flush, or nearly flush, with the surface of the sheave.

The flanges are formed upon the bushing *d d*, which, for this purpose, is made in two parts and separate from the main bushing A. This construction also admits that the exterior or main bushing should be made of iron and the interior of brass, and thus effects a saving of the more expensive metal without impairing the efficiency of the sheave.

The parts of the inner bushing, *d d*, are made of such a width that when forced into place from opposite sides they meet at the center, and leave the flanges flush with the plane surfaces of the bushing A.

The rollers properly arranged upon the annular plate are inserted after one bushing has been put in place, and the other, being forced into its position, holds them snugly and securely within the main bushing of the sheave.

By this construction the bushings may be cheaply made with secure and durable anti-friction rollers, the rollers operating much more efficiently by reason of their increased length.

In some kinds of sheaves the annular holding or dividing plate may be omitted and the beveled flanges relied upon wholly to retain the rollers in place. This would substantially be an application of my invention to the old form of sheave with anti-friction bearings, in which the rollers are held apart by rings at the ends of said rollers. In this form the flanges may be beveled to some extent, and the rollers made conical at the ends to correspond thereto, and thus somewhat lengthened, though not so much as in the form first described. They may also be made without any rings, being held in place by the beveled flanges alone. In casting these rings or linings upon a chill or core perfect enough to require no finish the lining may be used either with or without a flange.

Having thus described my invention, what I claim as new therein, and desire to secure by Letters Patent, is—

1. In a bearing for pulley-sheaves, the combination of the two-part bushing having the beveled flanges with the series of friction-rollers having conical ends and made to extend to, or nearly to, the surface of the sheave, whereby the bearing-surface is extended, as set forth.

2. An anti-friction bearing consisting of a series of rollers in combination with a notched annular holding-plate, said rollers being made conical at the ends and bearing upon inclined surfaces, as set forth.

3. In combination with a group of anti-friction rollers, substantially of the kind described, the inner flanged brass bushings, d d, and the outer iron bushing, A, as and for the purpose set forth.

In testimony whereof I have signed my name to this specification in the presence of two subscribing witnesses.

FRANCIS B. TORREY.

Witnesses:
L. W. SEELY,
C. N. ATWOOD.